Nov. 29, 1955     W. C. ANDERSON     2,725,551
MAGNETOMETER SYSTEM
Filed June 28, 1944
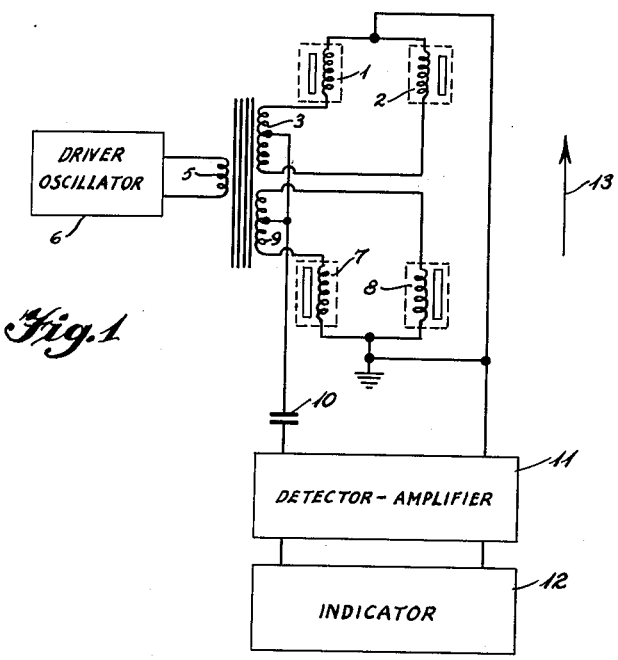
Fig.1
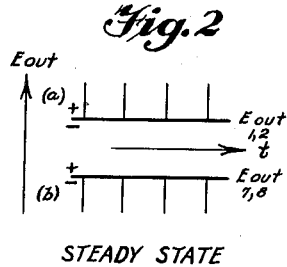
STEADY STATE
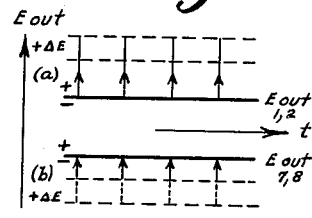
AMBIENT FIELD CHANGE (+)
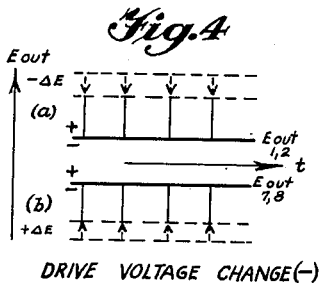
DRIVE VOLTAGE CHANGE (−)
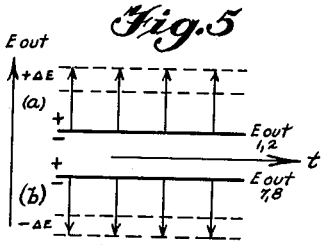
DRIVE VOLTAGE CHANGE (+)
Inventor
Wilmer C. Anderson
By
Walter S. Paul
Attorney

United States Patent Office 2,725,551
Patented Nov. 29, 1955

2,725,551

MAGNETOMETER SYSTEM

Wilmer C. Anderson, Douglaston, N. Y., assignor to the United States of America as represented by the Secretary of the Navy Application June 28, 1944, Serial No. 542,493

2 Claims. (Cl. 340—197)

This invention relates to an improved magnetometer system for measuring magnetic fields, and more particularly to a magnetometer of the saturated-core type especially adapted for use in measuring changes in the earth's magntic field. Such changes may be referred to as magnetic anomalies.

In the past, magnetometers have been proposed which employ a pair of substantially identical magnetometer elements each having a ferromagnetic core and at least one winding. A suitable alternating driving voltage was supplied to these windings, and the windings were suitably connected to a detector for the purpose of utilizing the output signal from the magnetometer elements. In such magnetometers, variations in the driving voltage caused corresponding variations in the outputs of each of the magnetometer elements, and hence resulted in appreciable undesired responses commonly referred to as "noise."

It is an object of the present invention to provide a magnetometer system in which noise due to fluctuations in the driving voltage is substantially eliminated. In accordance with the invention, this is done by utilizing two pairs of magnetometer elements instead of the previously employed single pair, and so connecting these pairs that an increase in output in one pair due to a change in the driving voltage is effectively counterbalanced by a corresponding decrease in the output of the other pair due to the same change in driving voltage.

Another object of this invention is the provision of two pairs of magnetometer elements, one pair oriented 180 degrees with respect to the other, for the purpose of substantially eliminating output signals due to fluctuations in the driving voltage.

Figure 1 shows a circuit diagram of the magnetometer.

Figures 2-5 show curves illustrating the operation of the magnetometer.

Referring now to Figure 1 of the drawing, there are shown a pair of magnetometer elements 1 and 2, each comprising a winding and a ferromagnetic core, connected in a bridge circuit with center-tapped output winding 3 of transformer 4, primary winding 5 of which is connected to the output of driver oscillator 6. A second pair of magnetometer elements 7 and 8 are similarly connected in a bridge circuit with center-tapped secondary winding 9 of transformer 4. The outputs of the bridge circuits including respectively magnetometer elements 1 and 2 and magnetometer elements 7 and 8 are connected in parallel and, through capacitor 10, to the input of detector-amplifier unit 11, the output of which supplies indicator 12. Arrow 13 indicates the direction of the ambient magnetic field at a given instant.

In operation, magnetometer elements 1, 2, 7 and 8 are acted upon simultaneously by the magnetic field having the direction indicated at 13, and the resultant output voltage is applied to detector-amplifier unit 11. The driving voltage from driver oscillator 6 is applied, through transformer 4, to magnetometer elements 1 and 2 in one polarity at a given instant with respect to the direction of the magnetic field at that instant, and to magnetometer elements 7 and 8 in the other polarity relative to the magnetic field. The output voltages of the two pairs of magnetometer elements, therefore, are so phased that fluctuations due to changes in the magnitude of the driving voltage tend to cancel, and those due to changes in the magnetic field tend to add. The net result, assuming that the magnetometer elements are substantially identical and that their respective bridge circuits are substantially balanced, will be negligible noise in the output signal due to small changes in the driving voltage.

By reference to Figs. 2 through 5 the operation will be more apparent. Figs. 2 through 5 show $E_{out}$ on the ordinates and $t$ on the abscissas, where $E_{out}$ is voltage output and $t$ is time. In Fig. 2, (a) shows the voltage output for elements 1 and 2 while (b) shows the output for elements 7 and 8. This figure represents a steady state or constant field. Due to the fact that the induced flux build up in elements 1 and 2 is in a positive direction the output is indicated by a series of positive pulses. The induced flux built up in elements 7 and 8 is in a negative direction and therefore the output is a series of negative pulses. The fact that the flux build-up is positive in elements 1 and 2, and negative in elements 7 and 8, is caused by the windings in the former elements being wound opposite to the windings in the latter elements. When elements 1, 2, 7 and 8 are connected into a bridge circuit, as shown in Fig. 1, the resultant output will be a series of pulses, the amplitude of which is equal to the sum of the positive and negative pulses.

Fig. 3 shows how a change in the ambient field, in this instance a positive increase, affects elements 1, 2 and 7, 8. As shown at (a) the positive pulses have an amplitude larger by the amount $\Delta E$, where $\Delta E$ is the amount of positive increase. At (b) in Fig. 3, the negative pulses have decreased in amplitude an amount equal to $\Delta E$. The resultant output will be equal to the sum of the positive and negative pulses with the net change being $+2\Delta E$.

An opposite effect will be noted in Figs. 4 and 5, wherein the drive voltage fluctuates, the amplitude decreasing in Fig. 4 and increasing in Fig. 5. Assuming a constant ambient field, the height of the positive pulses will vary as the amplitude of the drive voltage varies. The positive pulses, under a decreased drive voltage, decrease in amplitude, while the negative pulses, under the same decreased drive voltage, also decrease in amplitude. Therefore in Fig. 4, the positive pulses are changed in amplitude by an amount $-\Delta E$ which decreases the amplitude of the pulses. The negative pulses are changed by an amount $+\Delta E$ which also decreases the amplitude of the pulses. It will be seen therefore that if only elements 1, 2 were in the system there would be an erroneous output, the error being equal to the amount $\Delta E$. However, the present invention utilizes in addition elements 7, 9 and connects elements 1, 2 and 7, 8 in a bridge circuit, whereby the drive voltage changes are cancelled out and the resultant output is not affected by the drive voltage change. In other words, the net change is zero.

Fig. 5 illustrates the same principle as Fig. 4, the only difference being that the drive voltage has increased. Still, the net change in output voltage is zero.

In one particular embodiment in accordance with the invention, it was found that a change in driving voltage as large as two per cent produced a noise of less than 0.1 gamma. This was well below the noise level in the system due to other causes.

In the arrangement shown in the drawing by way of example, the outputs of the two magnetometer bridges are connected in parallel. It will be understood, however, that a series connection of these outputs is within the scope of the invention and will provide a similar improvement in the signal-to-noise ratio attained. Although no means are shown for applying a direct-current bias voltage to the magnetometer elements for the purpose of counteracting the earth's magnetic field in order to render the system more sensitive to changes therein, it is within the scope of the invention to employ any suitable means for accomplishing this purpose. It will also be understood that, instead of pairs of magnetometer elements each having a single winding and a core, two cores each having two windings may be employed without departing from the scope of the invention.

Having thus described my invention what I claim is:

1. A magnetometer system comprising a source of alternating driving voltage, a pair of magnetometer bridge circuits, each of said bridge circuits including a pair of magnetometer elements, each of said elements including a coil and a core, means coupling said source of alternating drive voltage with each of said magnetometer bridge circuits for driving said element coils, the coils in one of said pair of bridge circuits being wound opposite to the coils in the other of said pair of bridge circuits so that the flux build-up in said one circuit is opposite in polarity to the flux build-up in said other circuit, indicator means connected to the outputs of said pair of bridge circuits, whereby noise in said outputs due to fluctuation in the driving voltage is substantially eliminated and the indications thereby made more sensitive.

2. In a magnetometer system, a pair of magnetometer bridge circuits, alternating driving voltage means coupled thereto, the magnetic effect of one of said bridge circuits being opposite to that of the other circuit to provide a 180° phase relation between the driving flux build-up in said magnetometers in one circuit relative to those in the other, and indicator means connected to the outputs of said bridge circuits, whereby noise in said outputs due to fluctuations in the driving voltage is substantially eliminated and the indications thereby made more sensitive.

References Cited in the file of this patent

UNITED STATES PATENTS

| | | |
|---|---|---|
| 1,948,238 | Prince | Feb. 20, 1934 |
| 1,967,812 | Drake | July 24, 1934 |
| 2,082,646 | Mead | June 1, 1937 |
| 2,252,059 | Barth | Aug. 12, 1941 |
| 2,388,070 | Middel | Oct. 30, 1945 |
| 2,393,669 | Wheaton | Jan. 29, 1946 |